United States Patent [19]
Vishlitzky et al.

[11] Patent Number: 5,845,147
[45] Date of Patent: Dec. 1, 1998

[54] SINGLE LOCK COMMAND FOR AN I/O STORAGE SYSTEM THAT PERFORMS BOTH LOCKING AND I/O DATA OPERATION

[75] Inventors: Natan Vishlitzky, Brookline; Yoav Raz, Newton, both of Mass.

[73] Assignee: EMC Corporation, Hopkinton, Mass.

[21] Appl. No.: 617,690

[22] Filed: Mar. 19, 1996

[51] Int. Cl.$^6$ ............................ G06F 15/16; G06F 13/20
[52] U.S. Cl. ........................... 395/825; 395/856; 395/726
[58] Field of Search .................................. 395/287–288, 395/472, 474, 490, 481, 848, 726, 856, 857, 728, 825; 711/152

[56] References Cited

U.S. PATENT DOCUMENTS

| | | | |
|---|---|---|---|
| 5,283,870 | 2/1994 | Joyce et al. | 711/152 |
| 5,341,491 | 8/1994 | Ramanujan | 711/152 |
| 5,347,648 | 9/1994 | Stamm et al. | 395/182.03 |
| 5,363,484 | 11/1994 | Desnoyers et al. | 395/200.42 |
| 5,408,629 | 4/1995 | Tsuchiya et al. | 711/151 |

*Primary Examiner*—Dung C. Dinh
*Attorney, Agent, or Firm*—Fish & Richardson P.C.

[57] ABSTRACT

A method of handling I/O operations in a multiprocessor system which includes a plurality of host processors that are connected to a data storage system through corresponding connections, wherein the data storage system includes a lock manager and wherein the plurality of host processors communicate over the connections with the data storage system by using an interface protocol which permits only a single command to be sent during each complete transfer over the connection. The method includes the steps of generating a combined lock-I/O command within one of the host processors, wherein the combined lock-I/O command represents a request to the data storage system to perform at least two operations including a locking operation and an I/O operation that is to be performed by the data storage system on data stored therein; transferring said combined lock-I/O command to the data storage system over the connection for one of the host processors; in response to receiving the combined lock-I/O command at the data storage system, causing the lock manager within the data storage system to perform the locking operation on data stored therein; and also in response to receiving the combined lock-I/O command at the data storage system, causing the data storage system to perform an I/O operation corresponding to the combined lock-I/O command.

10 Claims, 2 Drawing Sheets

SINGLE LOCK COMMAND FOR AN I/O STORAGE SYSTEM THAT PERFORMS BOTH LOCKING AND I/O DATA OPERATION

BACKGROUND OF THE INVENTION

The invention relates generally to data storage systems and more particularly to the lock and I/O services used in connection with data storage systems.

An increasing number of powerful data storage systems are becoming commercially available. These systems provide central data storage for a plurality of host processors that are connected to them. Some of these data storage systems are capable of storing and rapidly accessing hundreds of gigabytes, even terabytes, of data.

The Symmetrix 3XXX and 5XXX Series data storage systems that are sold by EMC, Corp. of Hopkinton, Mass. are good examples of these new, high performance data storage systems. The Symmetrix data storage systems, which are frequently used for online transaction processing and other response-intensive applications, are part of a group of data storage systems that are more generally referred to as integrated cached disk array systems. Such systems include a large array of small disk storage devices and a large cache memory. For example, in the disk array there may be as many as 128 5.24 inch disk storage devices each with its own cache buffer and the total cache can be above 4 Gigabytes. The cache is made up of high speed storage units which collectively are used as an intermediary between the host processors that are connected to the data storage system and the internal storage disks of the disk array. Internally, a plurality of microprocessors (e.g. up to 144 individual microprocessors) handle accesses to the cache and the disks of the disk array. Thus, a high degree of parallelism and thus efficiency is possible in processing I/O tasks.

These systems are based on the principle that currently active data at any given time is relatively small in comparison to the total amount of data that is stored in the system and thus the currently active data is stored in the cache where it can be accessed very quickly. Because access times for reading and writing to cache are much shorter than for disks, storing active data in cache memory results in a substantial improvement in performance.

Such systems use various other techniques to enhance performance and reliability. For example, in the Symmetrix data storage systems, the cache has a separate power supply with battery backup so that a power failure to the main system will not result in loss of data in the cache. Also those systems include a mirroring facility to generate a duplicate of all stored data. In accordance with mirroring, the data storage system generates two copies of data in the disk array, each copy on a different set of the disks. When writes occur to data in the system, both copies are updated. Thus, if one disk fails wiping out all of the data stored on that disk, a duplicate of that data can be found and accessed on another disk.

The present invention makes possible further improvements on the performance of today's high performance data storage systems.

SUMMARY OF THE INVENTION

For multi-processor systems which include central data storage having an internally implemented lock manager, we have defined a new command which combines a lock request with an I/O request into a single command. With this new combined lock-I/O command, when a host processor performs an I/O operation on data that is stored within the data storage system, rather than having to send two separate commands (i.e., one command requesting a lock and, assuming the lock is granted, a later command requesting the I/O service), it can send this single command that combines both requests. In this way, users can achieve a performance gain in their transactions with the data storage system. Indeed, in system which involve huge numbers of transactions with the data storage system, e.g. online transaction processing systems, the performance gains can be substantial.

In general, in one aspect, the invention is a method of handling I/O operations in a multiprocessor system which includes a plurality of host processors that are connected to a data storage system through corresponding connections, and wherein the data storage system includes a lock manager and wherein the plurality of host processors communicate over the connections with the data storage system by using an interface protocol which permits only a single command to be sent during each individual transfer over the connection. The method includes the steps of generating a combined lock-I/O command within one of the host processors, wherein the combined lock-I/O command represents a request to the data storage system to perform at least two operations including a locking operation and an I/O operation that is to be performed by the data storage system on data stored therein; transferring the combined lock-I/O command to the data storage system over the connection for the host processor; in response to receiving that combined lock-I/O command at the data storage system, causing the lock manager within the data storage system to perform the locking operation on data stored therein; and also in response to receiving the combined lock-I/O command at the data storage system, causing the data storage system to perform an I/O operation corresponding to the combined lock-I/O command.

Preferred embodiments include the following features. The combined lock-I/O command represents a request to the data storage system to perform a locking operation on a specified segment of data storage and a request to perform a read of data stored within that specified segment of data storage. Alternatively, the combined lock-I/O command represents a request to the data storage system to perform a locking operation on a specified segment of data storage and to perform a write to the specified segment of data storage.

In general, in another aspect, the invention is a host interface in a host processor which connects to a data storage system that includes an internal lock manager. The host interface includes a lock manager interface which defines and supports a combined lock-I/O command that is available to be called by an application that is running on the host processor; and a driver which sends the combined lock-I/O command over the connection to the data storage system. The driver implements an I/O interface protocol that supports the sending of only one command entity at a time to the data storage system and the combined lock-I/O command represents a request to the data storage system to perform at least two operations including a locking operation and an I/O operation that is to be performed by the data storage system on data stored therein.

In preferred embodiments, the driver implements a SCSI bus protocol.

In general, in yet another aspect, the invention is a data storage system which provides shared data storage for one or more host processors which communicate with said data storage system through I/O services. The data storage system includes a data storage device on which data is stored; a lock manager which controls accesses by one or more of the host processors to the data stored within the data storage device; an I/O subsystem which processes I/O requests from one or more of the host processors that are connected to the data storage system; and a controller which receives and responds to a combined lock-I/O command sent by one of the one or more host processors. The combined lock-I/O command represents a request to the data storage system to perform at least two operations including a locking operation and an I/O service that is to be performed by the data storage system on data stored therein and the controller responds to receiving the lock-I/O command by first obtaining a lock through the lock manager and then by obtaining through the I/O subsystem the requested I/O service.

Other advantages and features will become apparent from the following description of the preferred embodiment and from the claims.

DESCRIPTION OF THE PREFERRED EMBODIMENTS

Figure 1:
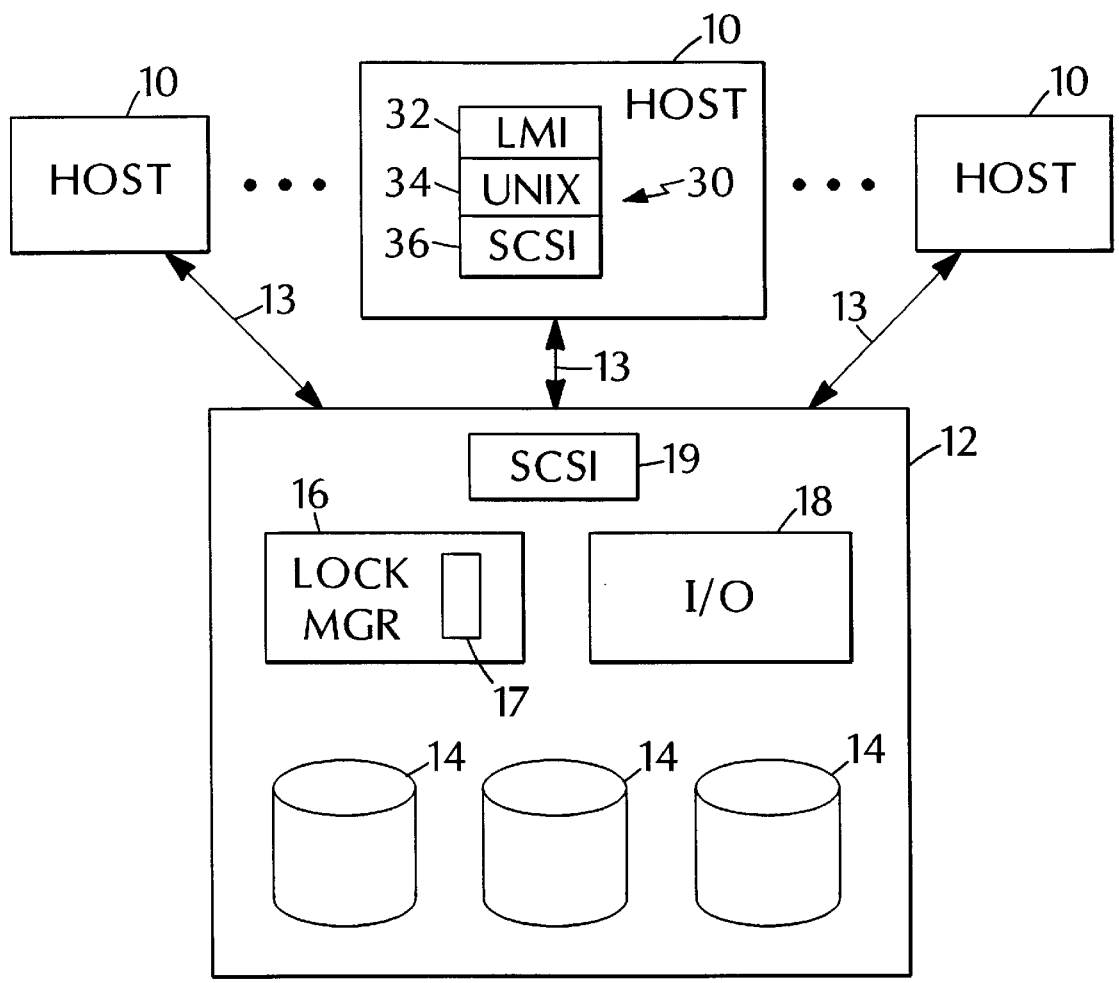
FIG. 1 is a block diagram of a system which embodies the invention.

Referring to FIG. 1, a system which embodies the invention includes a plurality of host processors 10 that are connected to a central data storage system 12 through respective host connections 13. Host processors 10 are digital processing units which include one or more CPU's and main memory. They might be, for example, PC's, workstations, symmetric multiprocessors (SMPs) or a massively parallel processor (MPP), which has many CPU'S. Their number can range from only two processors to many more than that. Regardless of their number, the principles of operation which are described below would be the same.

In relevant part, data storage system 14 implements a set of volumes 14 in which data is stored. At least some of the volumes are shared volumes, by which it is meant that they can be accessed by multiple of the host processors. To coordinate accesses to the shared volumes, data storage system 12 also includes a lock manager 16 and an I/O controller 18.

Lock manager 16 issues and releases locks on data records or blocks of data within data storage system 12 in response to requests from host processors 10. Since the principles of operation and design of lock managers is well known to persons skilled in the art, we will not go into the details of the operation of lock manager 16 but rather simply refer the reader to the public literature on this subject, e.g. see *Transaction Processing: Concepts and Techniques* by Jim Gray and Andreus Reuter, Morgan Kaufmann Publishers, 1993 edition.

In general, suffice it to say that host processors 10 request the lock services of lock manager 16 and lock manager 16 responds by granting those services. If there are simultaneous requests from multiple host processors, lock manager 16 will select one of the requests in accordance with a selection or priority algorithm and it will either notify the other host processors that they must try again later or it will place the other requests on a lock request queue 17 for subsequent processing after the granted lock is released.

I/O controller 18 processes the I/O requests that are received from host processors 10. In general, it responds to the read and write requests from host processors 10 and it manages the accesses to the appropriate locations in memory either to read the data from that location, in the case of a read request, or to write data to that location, in the case of a write request. The I/O request processing may involve first checking whether the requested data is in cache memory and, if it is, obtaining the address of the record and sending the data to the requesting host processor to complete the read operation. If the data is not in cache memory, the I/O controller will identify the disk device on which it is located, transfer the data to cache memory, and send the data to the requesting host processor.

Host processors 10, using I/O services, access shared data that is stored within data storage system 12. Typically, to access a particular data record or block of data, a lock is first obtained on that segment of data by the process or processor that is intending the obtain access. Then, assuming the lock is granted, the access (e.g. a read or a write) is performed.

With the lock manager implemented in storage, as described above, we have recognized that it is possible to realize a significant gain in performance by combining the lock and I/O requests into a single command or packet that is sent to data storage system 12. With this modification, initiating an I/O operation requires only a single pass across the interface between the host processor and the data storage system. As should be readily apparent, this significantly reduces the traffic over the connections between the host processors and the data storage system as compared to prior approaches which required one pass to request the lock and a subsequent pass to request the I/O service.

The requests for the two operations that are required to access a record or block of data, i.e., the lock request and the read/write request, are combined within a single instruction or a single command packet that is sent over the connection. After data storage system 12 receives and interprets this single instruction, it performs the two operations that are requested.

In the described embodiment, host processors 10 have UNIX operating systems which provide the normal set of services that are typical of that operating system. In addition, communications over connections 13 between host processors 10 and data storage system 10 are handled in accordance with a SCSI bus protocol. SCSI, which stands for Small Computer System Interface, is a widely used peripheral interface for transferring data and commands between a host processor and external devices, such as a mass storage devices including disk drives, tape devices, and other a data storage devices. The SCSI bus protocol, of which there are currently three versions, namely, SCSI-1, SCSI-1 and SCSI-3, is a device independent I/O bus protocol. It makes available a number of commands for querying the devices connected to the SCSI bus about certain parameters.

To provide the I/O functionality which is required to query the data storage system, each host processor includes an interface 30 through which it connects via the host connection to the data storage system. In most respects, interface 30 is of a conventional design except that it is modified to support the combined lock-I/O command. It has three distinct components, namely, a lock manager interface (LIMI) 32; a UNIX OS level, system call layer 34; and a SCSI Command layer 36.

LMI 32 exposes the functionality of the I/O services, including the combined lock-I/O command, to the application that is running on the host processor. The UNIX layer 34 packages the commands that are called by the application for presentation to the SCSI command layer 36. The SCSI command layer 36 then generates the appropriate command descriptor block (CDB) and sends that CDB over the SCSI bus to data storage system 12.

With this general overview, a more detailed description of the data storage system which provides the above-described functionality will now be presented.

Figure 2:
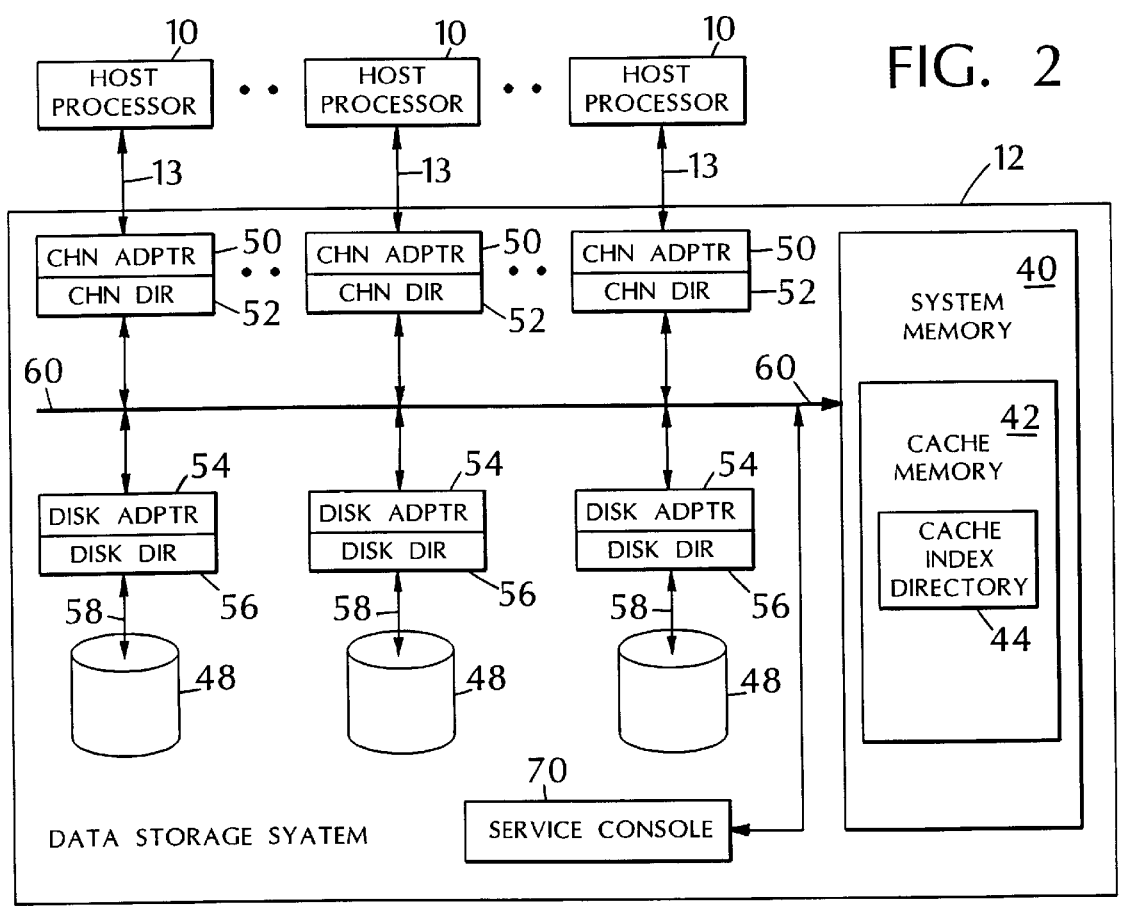
FIG. 2 is a more detailed block diagram of the internal structure of the data storage system shown in FIG. 1.

An example of a data storage system on which the combined lock-I/O command can be implemented is shown in FIG. 2. Data storage system 12 contains the physical memory in which data is stored. The particular manner in which the physical memory within storage system is implemented and how it is partitioned is not of central importance. Examples of commercially available products that can be used to implement data storage system 12 are the Symmetrix 5XXX™ series family of products from EMC Corporation of Hopkinton, Mass., which are high performance integrated cache disk arrays designed for online data storage. The following details about the internal structure and operation of data storage system 12 generally apply to the Symmetrix™ data storage systems. However, it should be understood that other designs known to persons skilled in the art may also be used to implement data storage system 12.

Data storage system 12 includes multiple arrays of disk devices 48 and a system memory 40. A portion of system memory implements cache memory 42. The multiple arrays of disk devices 48 provide a permanent data storage area and cache memory 42 provides a fast as well as temporary data storage area. Each disk device 48 includes a head-disk assembly, a microprocessor, and a data buffer which enables the data storage system to provide for parallel processing of data. In the described embodiment, system memory 40 is implemented by high-speed random-access semiconductor memory. Within cache memory 42 there is a cache index directory 44 which provides an indication of what data is stored in cache memory 42 and the address of that data in cache memory 42. Cache index directory 44 is organized as a hierarchy of tables for devices, cylinders, and tracks of data records, as further described in U.S. Pat. No. 5,206,939, issued Apr. 27, 1993, and incorporated herein by reference.

There is a group of channel adapters 50 and channel directors 52 that provide interfaces through which host processors 10 connect to data storage system 12. Each channel adapter 50 provides for direct attachment to the physical host connections. Channel director 52 contains a microprocessor that processes commands and data from host processors 12 and manages accesses to cache memory 52. Channel director 52 handles I/O requests from host processors 10. It uses cache index directory 44 which is stored in cache memory 42 to determine whether the request can be satisfied out of the cache or whether the data must be obtained from disk devices 48. It maintains data in cache memory based on the data access patterns. Channel directors 52 write data from host processors 10 into cache memory 42 and update cache index directory 44. They also access cache index directory 44 and read data from cache memory 42 for transfer to host processors 10.

There is also a disk adapter 54 and a disk director 56 through which each disk device array 48 is connected to cache memory 42. Disk adapter 54 interfaces to multiple SCSI buses 58 to which disk device arrays 48 are connected. Disk director 56 manages accesses to the disks within disk device arrays 48. Disk Director 56 stages data from the disk device arrays to cache memory 42 and it updates cache index directory 44, accordingly. It also de-stages or writes-back data from "written-to" blocks in cache memory 42 to the disk device arrays and again updates cache index directory 44, accordingly.

Disk adapters 54 and channel adapters 50 access system memory 40 through a high-speed, parallel line system bus 60. System memory 40 is implemented by multiple memory boards. Only one access to any given memory board may occur at any given time, however, multiple memory boards may be accessed at the same time to support concurrent operations.

Data storage system 12 can be configured into multiple logical volumes. Typically, a volume corresponds to a single disk device. A service console 70 within data storage system 12 enables the user to configure the data storage, i.e., to define the logical volumes and to specify which logical volumes are accessible through which host connections 13.

Note that data storage system 12 also includes additional functionality and features which are typically found in such system. Because such functionality and features are known to persons skilled in the art they will not be described here.

With this example of a specific data storage system that can be used to implement the system, we will now provide further details about the combined lock-I/O command and relevant functional components which support that commands.

The Lock-I/O Commands

There are three command types that are particularly relevant to the described embodiment, namely, the lock command, the unlock command, and the combined lock-I/O command.

The lock command that is used to obtain a logical lock on an object (e.g. a data block) has the following form:

int lock (lock_initiator,locked_object,lock_type,time_out)

The lock_initiator parameter is an identifier of the entity requesting a lock. It may be a Host_Connection_ID, Transaction_ID (TRID), Resource Manager ID, or any combination of them.

The locked_object parameter is the ID of an object that is to be locked. The object can be anything, e.g. a block, a combination of blocks, a logical record, a file, a field, etc. It is identified by name and the names of the objects that are stored in the data storage system are known to the host processors (i.e., they are obtained from the data storage system during system booting or upon establishing a connection to the data storage system).

The lock_type parameter specifies the type of the lock that is being requested. There are two common types, namely, a shared lock and an exclusive lock. A shared lock can be held by several initiators simultaneously and each of the initiators that holds such a lock can access the locked data. An exclusive lock can be held by only one lock initiator at a time and only that holder of the lock can access the locked data.

The unlock command that is used to release a logical lock held by the lock_owner from the lock_object has the following form:

int unlock (lock_owner,locked_object)

The lock_owner parameter identifies which lock_initiator was granted the lock and the lock_object parameter is the same as in the case of the lock command.

The combined lock-I/O command that is used to simultaneously request a lock on an object and an I/O operation involving that object have the following form:

int lock_and_io(lock_initiator,locked_object,lock_type,
   auto_unlock,operation,buffer_address,
   buffer_length)

The lock_initiator, locked_object, and lock-type parameters are the same as for the lock command described above.

The auto_unlock parameter is one bit which can have two states, referred to as long_lock and short_lock. If that bit is set (i.e., long_lock), the lock is explicitly unlocked by the unlock() function; otherwise, the lock is released immediately after I/O is completed and returned (i.e., short_lock). Note that including this parameter eliminates the need for another pass across the interface between the host processor and the data storage system. By setting it to short_lock, the lock releases automatically without requiring any further command from the host processor.

The operation parameter indicates whether the I/O operation is a read or a write. And the buffer_address and buffer_length relate to the buffer in the host processor from which the data is read, in the case of a write operation, or to which the data is written in the case of a read operation.

Each of the previously mentioned layers of interface 30 which implement the combined lock-I/O command on the host processor side will now be described in greater detail.
Lock Manager Interface (LMI)

When a user (e.g. an application that is running on the host processor) requests a locking service, LMI 32 fills in a command data structure, depending on the required service, and sends a system call icotl() with this cmd and its parameters via the UNIX level 34 to SCSI layer, which in turn sends it to data storage system 12. Typically, there will be an instant positive response from the data storage system in the case of a request to unlock. In the case of a lock request or a combined lock-I/O request, however, the lock is granted immediately only if it is free.

If the requested lock cannot be granted, the lock request is put on lock queue 17 (see FIG. 1) within data storage system 12. However, if lock queue 17 is full, the request is rejected. In the first case (i.e., when no immediate response is forthcoming from the data storage system), LMI 32 polls the data storage system at a predefined rate until the requested lock is granted or until a time-out threshold is reached. The response is then sent back to the user (e.g. the host CPU) that requested the lock. In the case of an immediate negative response, LMI 32 either immediately informs the user about rejection or it polls the data storage system until the lock request is granted or until the time-out threshold is reached.

The UNIX System call:

The UNIX system call Ioctl provides a general entry point for device specific commands and is used to send a host command to the data storage system. The system call has the following form:

int ioctl(int fd, int cmd, caddr_t arg)

where fd is a file descriptor returned by a prior open system call; command is a request of the SCSI driver to perform a particular action; and caddr_t arg is a pointer to a data structure that is to be used by the command.

An example of a ioctl() system call usage by a function is as follows:

```
int lock (...)
{...
i=ioctl(fd, USCSICMD, &u);
if (i!=O) {
    printf("\nIOCTL error =%d",i);
    ...}
}
```

In this example, USCISCMD is a user SCSI command.
The SCSI layer:

The SCSI layer includes a conventional SCSI driver, which is augmented or extended to support the new combined lock-I/O command. In general, the SCSI driver takes the parameters that the user sends via the ioctl system call and constructs the appropriate SCSI commands which are to be sent over the SCSI bus (i.e., the host connection) to the data storage system. The conventional SCSI driver is extended by layering the services which provide the combined lock-I/O command on top of it.

The SCSI layer also includes an additional layer above the augmented driver which implements an access method. An access method is a routine that "knows" the format of the data that is stored in the data storage system and it "knows" what sequence of operations are necessary to access that data. In general, the access method manipulates index data structures which are obtained from the data storage system during system booting or when the host connection was established with the data storage system. It manipulates the index data structure to find the location of the information or data that is being requested by the user. The access method layer translates this location information to generate a low level set of requests in the language that is understood by the device that is being communicated with. The detailed operation of various appropriate access methods are known to persons skilled in the art and thus will not be discussed here.

Each SCSI command is defined by a command descriptor block (CDB) which identifies the sequence of bytes that are sent across the SCSI bus when the command is sent. Only a single CDB can be sent during each complete transfer over the SCSI bus. The SCSI protocol defines eight command groups as follows:

Group 0 6-byte commands
Group 1 10-byte commands
Group 2 10-byte commands
Group 3 Reserved
Group 4 Reserved
Group 5 12-byte commands
Group 6 Vendor unique commands
Group 7 Vendor unique commands In the described embodiment, one of the group 0 commands, namely, "send diagnostics" and "receive diagnostics", are used to define and support the functionality of the new combined lock-I/O command. A flag within the send diagnostic command is set to identify the command as containing special functionality. When the data storage system receives the send diagnostic command, it checks the status of that flag. If it detects that the flag is set, indicating that the command is to be treated as a combined lock and I/O command, it processes the lock portion of the command and waits for an acknowledgment that the lock was granted. When the acknowledgment is received, it then processes the I/O portion of the command. The functionality, the algorithms, and the code that is used to process these two portions of the combined lock and I/O command are well known to persons skilled in the art and thus will not be presented here. Indeed, the same functionality can be used as is found in a conventional database system which includes an internal lock manager. The main difference is that the acknowledgment which is generated in response to a successful lock request is not sent back through the interface to the host processor but rather is processed internally. The I/O request portion of the command is not permitted to execute until the acknowledgment of a successful lock request is received. If such an acknowledgment is not received, the fail lock request is reported back to the host processor that sent the combined lock-I/O command.

If the I/O request is a read operation, then the transmission of the send diagnostic command is immediately followed by the transmission of a receive diagnostic command which is internally identified as being part of a combined lock-I/O command sequence. The receive diagnostic command is used by the data storage system to return the data to the host processor, i.e., it serves as the vehicle for transferring the data from the read operation back to the requesting process.

Since the send diagnostics and receive diagnostics commands are already recognized by a conventional SCSI driver, it is not necessary to provide a new driver. Rather, the functionality of the new command is simply layered on top of the existing driver.

Alternatively, one could also use the vendor unique commands of the SCSI protocol to define the special command for the combined lock-I/O functionality. In that case, however, it would require writing a new driver that recognized the new vendor-unique commands that were being implemented.

Referring again to FIG. 1, data storage system 12 includes a SCSI controller 19 that is connected to the other end of the SCSI bus. SCSI controller 19 receives and interprets the signals sent over the SCSI bus and directs the data storage system to respond appropriately. SCSI controller 19 performs all of the functions of a standard SCSI controller in addition to which it also has been modified to support the combined lock-I/O command. More specifically, when controller 19 receives a combined lock-I/O command, it first sends the lock request portion of the command to lock manager 16, and if a lock is granted, it then sends the I/O portion of the command to the I/O subsystem within the data storage system.

We note that SCSI is just one of several interfaces that are available for connecting host processors to the data storage system. By using it in the described embodiment, we do not intend to imply that the invention is limited only to systems which use SCSI to define the bus protocol for connecting host processors to the data storage system.

In general, the invention encompasses sending a single command packet or package through the interface to the data storage system which requests at least two operations, namely, a lock operation and an I/O operation. The single command packet represents a single command which contains two opcodes, as in the case of the SCSI example given above.

Other embodiments are within the following claims. For example, the locks that were described above were enforced by a lock manager that is located within the data storage system. One could instead use locks that are established by agreement among the entities which ae accessing the data storage system. In that case, the granting of a lock would be signalled through a flag and the other host processors which do not own the lock would by agreement not access the locked record(s) so long as the flag was set. In addition, the lock can be created by a separate module outside of and/or separate from the data storage system.

What is claimed is:

1. A method of handling I/O operations between a data storage system and a processor that is external to the data storage system, wherein said data storage system includes at least one external connection for connecting external devices thereto, wherein said processor is connected to the data storage system via said external connection, wherein the data storage system includes a lock manager and wherein communications over the at least one connection are in accordance with an I/O interface protocol which permits only a single command entity to be sent during each complete transfer over the at least one connection, said method comprising:

generating a combined lock-I/O command within said external processor, wherein said combined lock-I/O command is supported by said interface protocol and represents a request to the data storage system to perform at least two operations including a locking operation and an I/O operation that is to be performed by the data storage system on data stored therein;

transferring said combined lock-I/O command to the data storage system over the connection for said external processor;

in response to receiving said combined lock-I/O command at the data storage system, causing the lock manager within the data storage system to perform the locking operation on data stored therein; and also in response to receiving said combined lock-I/O command at the data storage system, causing the data storage system to perform an I/O operation corresponding to said combined lock-I/O command.

2. The method of claim 1 wherein said combined lock-I/O command represents a request to said data storage system to perform a locking operation on a specified segment of data storage and a request to perform a read of data stored within said specified segment of data storage.

3. The method of claim 1 wherein the combined lock-I/O command represents a request to said data storage system to perform a locking operation on a specified segment of data storage and to perform a write to the specified segment of data storage.

4. The method of claim 1 wherein the generating step comprises using a command data block to represent said combined lock-I/O command and wherein the transferring step involves sending said command data block to the data storage system.

5. The method of claims 4 wherein the generating step further comprises setting a flag inside said command block to identify said command block as representing said combined lock-I/O command.

6. The method of claim 1 wherein said interface protocol is a SCSI bus protocol.

7. The method of claim 1 wherein said combined lock-I/O command is a SCSI command.

8. In a processor that connects externally to a separate data storage system which includes a lock manager, an interface through which the external processor communicates with the data storage system, said interface comprising:

a lock manager interface which defines and supports a combined lock-I/O command that is available to be called by an application that is running on said external processor; and a driver which sends the combined lock-I/O command over the connection to the data storage system, wherein said driver implements an I/O interface protocol that supports the sending of only one command entity at a time to the data storage system and wherein said combined lock-I/O command is supported by said I/O interface protocol and represents a request to the data storage system to perform at least two operations including a locking operation and an I/O operation that is to be performed by the data storage system on data stored therein.

9. The host interface of claim 8, wherein said driver implements a SCSI bus protocol.

10. A data storage system which provides shared data storage for one or more processors that are external to the data storage system and which communicate with said data storage system through I/O services, said data storage system comprising:

a data storage device on which data is stored;

a lock manager which controls accesses by said one or more external processors to the data stored within said data storage device;

an I/O subsystem which processes I/O requests from said one or more external processors that are connected to the data storage system, said I/O subsystem implementing an I/O interface protocol that supports the sending of only one command entity at a time to the data storage system; and a controller which receives and responds to a combined lock-I/O command sent by one of said one or more external processors, wherein said combined lock-I/O command is supported by said I/O interface protocol and represents a request to the data storage system to perform at least two operations including a locking operation and an I/O service that is to be performed by the data storage system on data stored therein and wherein said controller responds to receiving said lock-I/O command by first obtaining a lock through said lock manager and then by obtaining through said I/O subsystem the requested I/O service.

* * * * *